(12) United States Patent
Oran et al.

(10) Patent No.: US 7,940,644 B2
(45) Date of Patent: May 10, 2011

(54) UNIFIED TRANSMISSION SCHEME FOR MEDIA STREAM REDUNDANCY

(75) Inventors: David R. Oran, Acton, MA (US); Bruce Thompson, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 11/686,321

(22) Filed: Mar. 14, 2007

(65) Prior Publication Data

US 2008/0225850 A1 Sep. 18, 2008

(51) Int. Cl.
- *G06F 11/00* (2006.01)
- *H04L 12/56* (2006.01)
- *H04L 1/00* (2006.01)
- *G08C 25/00* (2006.01)

(52) U.S. Cl. .................. 370/216; 370/389; 714/746
(58) Field of Classification Search .................. None
See application file for complete search history.

(56) References Cited

U.S. PATENT DOCUMENTS

| | | |
|---|---|---|
| 3,840,862 A | 10/1974 | Ready |
| 4,291,196 A | 9/1981 | Spaniol et al. |
| 4,426,682 A | 1/1984 | Riffe et al. |
| 4,802,085 A | 1/1989 | Levy et al. |
| 4,811,203 A | 3/1989 | Hamstra |
| 5,155,824 A | 10/1992 | Edenfield et al. |
| 5,307,477 A | 4/1994 | Taylor |
| 5,524,235 A | 6/1996 | Larson et al. |
| 5,551,001 A | 8/1996 | Cohen et al. |
| 5,636,354 A | 6/1997 | Lear |
| 5,734,861 A | 3/1998 | Cohn et al. |
| 5,828,844 A | 10/1998 | Civanlar et al. |
| 5,870,763 A | 2/1999 | Lomet |
| 5,926,227 A | 7/1999 | Schoner et al. |
| 5,933,195 A | 8/1999 | Florencio |
| 5,933,593 A | 8/1999 | Arun et al. |
| 6,003,116 A | 12/1999 | Morita et al. |
| 6,119,205 A | 9/2000 | Wicki et al. |
| 6,278,716 B1 | 8/2001 | Rubenstein et al. |
| 6,289,054 B1 | 9/2001 | Rhee |
| 6,567,929 B1 | 5/2003 | Bhagavath et al. |
| 6,608,841 B1 * | 8/2003 | Koodli .................. 370/474 |

(Continued)

FOREIGN PATENT DOCUMENTS

EP 1271953 1/2003

(Continued)

OTHER PUBLICATIONS

Pendleton, et al., Session Initiation Protocol Package for Voice Quality Reporting Event draft-ietf-sipping-rtcp-summary-01, Telchemy Incorpoated, http://www.ietf.org/internet-drafts/draft-ietf-sippin-rtcp-summary-01.txt, pp. 1-24, Feb. 2006.

(Continued)

*Primary Examiner* — Gregory B Sefcheck
(74) *Attorney, Agent, or Firm* — Stolowitz Ford Cowger LLP

(57) ABSTRACT

In one embodiment, a network session is established for transmitting a media stream. The media stream is encoded into a first set of media stream packets and the first set of media stream packets transmitted according to the established network session. The media stream is also encoded into a second set of retransmission-based repair packets and used as a second redundant copy of the media stream. The second set of retransmission packets are transmitted regardless of receiving any indication of lost or dropped packets during the network session.

15 Claims, 5 Drawing Sheets

U.S. PATENT DOCUMENTS

| | | | |
|---|---|---|---|
| 6,766,418 B1 | 7/2004 | Alexander | |
| 6,782,490 B2 | 8/2004 | Maxemchuk et al. | |
| 6,792,047 B1 | 9/2004 | Bixby et al. | |
| 6,804,244 B1 | 10/2004 | Anandakumar et al. | |
| 6,865,157 B1 | 3/2005 | Scott et al. | |
| 6,910,148 B1* | 6/2005 | Ho et al. | 714/4 |
| 7,114,002 B1* | 9/2006 | Okumura et al. | 709/232 |
| 7,164,680 B2* | 1/2007 | Loguinov | 370/394 |
| 7,180,896 B1* | 2/2007 | Okumura | 370/394 |
| 7,224,702 B2 | 5/2007 | Lee | |
| 7,234,079 B2* | 6/2007 | Cheng et al. | 714/20 |
| 7,257,664 B2* | 8/2007 | Zhang | 714/748 |
| 7,263,075 B2* | 8/2007 | Roh et al. | 370/310 |
| 7,296,205 B2 | 11/2007 | Curcio et al. | |
| 7,324,527 B1* | 1/2008 | Fraas et al. | 370/401 |
| 7,373,413 B1 | 5/2008 | Nguyen et al. | |
| 7,392,424 B2* | 6/2008 | Ho et al. | 714/4 |
| 7,397,759 B2* | 7/2008 | Tan et al. | 370/216 |
| 7,532,621 B2 | 5/2009 | Birman et al. | |
| 7,562,277 B2* | 7/2009 | Park et al. | 714/748 |
| 7,707,303 B2* | 4/2010 | Albers et al. | 709/231 |
| 2002/0006137 A1 | 1/2002 | Rabenko et al. | |
| 2002/0114332 A1 | 8/2002 | Apostolopoulos et al. | |
| 2002/0126711 A1 | 9/2002 | Robinett et al. | |
| 2003/0101408 A1 | 5/2003 | Martinian et al. | |
| 2003/0158899 A1 | 8/2003 | Hughes | |
| 2003/0236903 A1 | 12/2003 | Piotrowski | |
| 2004/0071128 A1 | 4/2004 | Jang et al. | |
| 2004/0078624 A1 | 4/2004 | Maxemchuk et al. | |
| 2004/0100937 A1 | 5/2004 | Chen | |
| 2004/0114576 A1* | 6/2004 | Itoh et al. | 370/352 |
| 2004/0143672 A1 | 7/2004 | Padmanabham et al. | |
| 2004/0196849 A1* | 10/2004 | Aksu et al. | 370/395.2 |
| 2004/0244058 A1 | 12/2004 | Carlucci et al. | |
| 2005/0058131 A1* | 3/2005 | Samuels et al. | 370/389 |
| 2005/0074007 A1* | 4/2005 | Samuels et al. | 370/392 |
| 2005/0078698 A1 | 4/2005 | Araya et al. | |
| 2005/0099499 A1 | 5/2005 | Braunstein | |
| 2005/0198367 A1 | 9/2005 | Ettikan | |
| 2005/0207406 A1* | 9/2005 | Reme | 370/389 |
| 2005/0249231 A1 | 11/2005 | Khan | |
| 2005/0265346 A1* | 12/2005 | Ho et al. | 370/392 |
| 2005/0289623 A1 | 12/2005 | Midani et al. | |
| 2006/0075084 A1* | 4/2006 | Lyon | 709/223 |
| 2006/0075443 A1 | 4/2006 | Eckert | |
| 2006/0083263 A1 | 4/2006 | Jagadeesan et al. | |
| 2006/0085551 A1 | 4/2006 | Xie et al. | |
| 2006/0120378 A1 | 6/2006 | Usuki et al. | |
| 2006/0126667 A1 | 6/2006 | Smith et al. | |
| 2006/0143669 A1 | 6/2006 | Cohen | |
| 2006/0159093 A1 | 7/2006 | Joo et al. | |
| 2006/0187914 A1 | 8/2006 | Gumaste et al. | |
| 2006/0188025 A1 | 8/2006 | Hannuksela | |
| 2006/0242240 A1 | 10/2006 | Parker et al. | |
| 2006/0242669 A1 | 10/2006 | Wogsberg | |
| 2006/0279437 A1 | 12/2006 | Luby | |
| 2007/0008934 A1* | 1/2007 | Balasubramanian et al. | 370/335 |
| 2007/0044130 A1 | 2/2007 | Skoog | |
| 2007/0204320 A1 | 8/2007 | Wu et al. | |
| 2007/0214490 A1 | 9/2007 | Cheng et al. | |
| 2007/0268899 A1* | 11/2007 | Cankaya | 370/390 |
| 2007/0277219 A1 | 11/2007 | Toebes et al. | |
| 2008/0062990 A1* | 3/2008 | Oran | 370/392 |
| 2008/0189489 A1 | 8/2008 | Mitra | |
| 2008/0192839 A1 | 8/2008 | Gahm et al. | |
| 2008/0253369 A1 | 10/2008 | Oran | |
| 2008/0256409 A1 | 10/2008 | Oran et al. | |
| 2008/0267078 A1 | 10/2008 | Farinacci et al. | |
| 2008/0310435 A1* | 12/2008 | Cagenius et al. | 370/401 |
| 2009/0034627 A1 | 2/2009 | Rodriguez | |
| 2009/0034633 A1 | 2/2009 | Rodirguez et al. | |
| 2009/0049361 A1 | 2/2009 | Koren et al. | |
| 2009/0055540 A1 | 2/2009 | Foti et al. | |
| 2009/0119722 A1 | 5/2009 | VerSteeg et al. | |
| 2009/0150715 A1 | 6/2009 | Pickens et al. | |
| 2009/0201803 A1 | 8/2009 | Filsfils et al. | |
| 2009/0201805 A1 | 8/2009 | Begen | |
| 2009/0213726 A1 | 8/2009 | Asati | |
| 2010/0005360 A1 | 1/2010 | Begen | |
| 2010/0036962 A1 | 2/2010 | Gahm | |

FOREIGN PATENT DOCUMENTS

| | | |
|---|---|---|
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 8731381.3 | 11/2009 |
| WO | 9718637 | 5/1997 |
| WO | 0035201 | 6/2000 |
| WO | WO 00/76113 | 12/2000 |
| WO | 2001061909 | 8/2001 |
| WO | 2006031925 | 3/2006 |
| WO | 2006057606 | 6/2006 |
| WO | 2006107424 | 10/2006 |
| WO | WO 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009099847 | 8/2009 |

OTHER PUBLICATIONS

Schulzrinne, et al., RPT: A Transport Protocol for Real-Time Applications, Network Working Group, 2003, pp. 1-92.

Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.

International Search Report for PCT/US09/032305; Date of mailing Oct. 5, 2009.

Written Opinion of the International Searching Authority for PCT/US09/032305; Date of mailing Oct. 5, 2009.

International Search Report for PCT/US08/55837; Date of mailing Jul. 3, 2008.

Written Opinion of the International Searching Authority for PCT/US08/55837; Date of mailing Jul. 3, 2008.

USPTO, PCT International Search Report for PCT/US07/76264, Jul. 7, 2008, 3 pgs.

Rosenberg, J., et al., "Registration of parityfec MME types", RFC 3009, Nov. 2000, 11 pgs.

Luby, M., et al., "Forward Error Correction (FEC) Building Block", RFC 3452, Dec. 2002, 16 pages.

Luby, M., et al., "Compact Forward Error Correction (FEC) Schemes", RFC 3695, Feb. 2004, 14 pages.

Ott, J., et al., "Extended RTP Profile for RTCP-based Feedback (RTP/AVPF)",RFC 4585; draft-ietf-avt-rtcp-feedback-11, Aug. 10, 2004, 52 pages.

Watson, M., "Basic Forward Error Correction (FEC) Schemes", draft-ietf-rmt-bb-fec-basic-schemes-revised-02, Mar. 3, 2006, 17 pages.

Chesterfield, J., et al., "RTCP Extensions for Single-Source Multicast Sessions", draft-ietf-avt-rtcpssm-11, Mar. 6, 2006, 67 pages.

Rey, J., et al., "RTP Retransmission Payload Format", RFC 4588, Jul. 2006, 24 pages.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

Written Opinion of the International Searching Authority for PCT/US08/52907; Mailing Date Jul. 7, 2008.

Written Opinion of the International Searching Authority for PCT/US07/76264; Mailing date Jul. 7, 2008.

International Search Report for PCT/US07/76265 ; Mailing date Aug. 20, 2008.

Written Opinion of the International Searching Authority for PCT-US07-76265; Aug. 20, 2008.
Degalahal, et al., Analyzing Soft Errors in Leakage Optimized SRAM Design, Article, Jan. 2003, pp. 1-7, 16th International Conference On VLSI Design.
Zhang, Computing Cache Vulnerablity to Ransietn Errors and It's Implication, Article, Oct. 2005, pp. 1-9, IEEE Computer Society.
Weaver, et al. Reducing the Soft-Error Rate of a High-Performance Microprocessor, Article, 2004, pp. 30-37, IEEE Computer Society.
Li, et al., Soft Error and Energy Consumption Interactions: A Data Cache Perspective, Article, Aug. 9, 2004, pp. 1-6, ISLPED '04.
USPTO, PCT International Search Report for PCT/US08/52907, Jul. 7, 2008, 3 pgs.
Stolowitz Ford Cowger LLP, Listing of related cases Mar. 3, 2010.
Supplementary European Search Report for EP08731381, Mar. 26, 2010, 7 pages.
Rey et al., "RTP Retransmission Payload Format—RFC 4588", Jul. 1, 2006, 29 pages.
European Search Report for EP08728919; Aug. 19, 2010; 11 pgs.
Handley, M. et al., "SIP: Session Initiation Protocol", RFC 2543, Mar. 1999.
T. Friedman, "RTP Control Protocol Extended Reports (RTCP XR)", RFC 3611, Nov. 2003.
Ott, "Extended RTP Profile for RTCP-based Feedback (RTP/AVPF)" draft-ieft-av-rtcp-feedback-01-txt., Nov. 21, 2001.
Approach Inc., "Streaming Media Technical Analysis", Nov. 2000.
Turner, Jonathan S., "WDM Burst Switching" www.isoc.org/inet99/proceedings/4j/4j_3.htm, 1999.
GossamerThreads, "Channel Change Speed", www.gossamer-threads.com/lists/engine?do=post_view_flat;post=13776, Sep. 12, 2003.
Nguyen, Thinh et.al., Protocols for Distributed Video Streaming, IEEE ICIP 2002.
Byers, John W. et al., Accessing Multiple Mirror Sites in Parallel: Using Tornado Codes to Speed Up Downloads, IEEE 1999.
Cisco Systems, Cisco Visual Quality Experience: Product Overview, www.cisco.com/en/US/partner/prod/collateral/video/ps7191/ps7126/product_data_sheet0900aecd8057f446.html, 2009.
Cisco Systems, Converge IP and DWDM Layers in the Core Network, http://www.cisco.com/en/US/prod/collateral/routers/ps5763/prod_white_paper0900aecd80395e03.html, 2007.
Silver Peak Systems, Inc., "Data Center Class WAN Optimization: Latency & Loss Mitigation", www.silver-peak.com/Technology/latency_loss_mitigation.htm., 2010.
P. A. Chou and Z. Miao, "Rate-distortion optimized streaming of packetized media," Microsoft Research Technical Report MSR-TR-2001-35, Feb. 2001.
Begen, Ali C., Enhancing The Multimedia Experience in Emerging Network, A Thesis Presented to The Academic Faculty; Dec. 2006; available at http://etd.gatech.edu/theses/available/etd-11062006-002415/; Dec. 2006.
Rajamoni, Ramakrishnan, R. bhagavathula, and R. Pendse. "Timing analysis of block replacement algorithms on disk caches." 43rd IEEE Midwest Symposium on Circuits and Systems, Proceedings, Aug. 8-11, 2000.
Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.

* cited by examiner

SPATIAL REDUNDANCY

TEMPORAL REDUNDANCY

TEMPORAL REDUNDANCY WITH SEPARATE MEDIA SESSIONS

UNIFIED TRANSMISSION SCHEME FOR MEDIA STREAM REDUNDANCY

TECHNICAL FIELD

The present disclosure relates generally to networking.

BACKGROUND

Robust video delivery requires essentially loss-free delivery of video to all the receivers so the decoders can produce outputs without visible artifacts. This applies both for a single receiver in the unicast case and possibly millions of receivers in the multicast case.

Packet networks lose packets due to a number of impairment events, including congestion, link errors, and re-routing events. Individual losses or short burst losses can be adequately repaired with Forward Error Correction (FEC) or selective retransmission techniques, depending on the exact nature of the error and the delay in the network. However, for longer bursts FEC has poor engineering tradeoffs in terms of delay, bandwidth, and complexity, compared to simple stream redundancy (i.e. sending two or more copies of the same stream).

Similarly, selective retransmission is workable only where there is a very short round-trip time between the receivers and the transmitter. In addition, it is difficult and complex to limit the duration of certain outages in packet networks through techniques like MultiProtocol Label Switching (MPLS) or IP Fast ReRoute (FRR).

A number of stream redundancy techniques are possible. These include spatial techniques where copies of the packets are sent over disjoint paths. Stream redundancy can also include temporal techniques where copies of the packets are delayed in time by more than the expected outage duration.

However, each of these techniques in preexisting systems required both different algorithmic structure and different transport encapsulation and encoding, which makes the design and implementation of transmitters and receivers which want to support multiple techniques difficult.

DESCRIPTION OF EXAMPLE EMBODIMENTS

Overview

Both temporal and/or spatial stream redundancy is provided using a retransmission scheme where the retransmission is "always on" as opposed to requested on demand. This results in a redundant media stream scheme where both transmitters and receivers can utilize the same overall transport protocol, wire encodings, transmit/receive logic, etc. independent of primary service goals that provide conventional selective retransmission-based repair, spatial redundancy, or temporal redundancy.

In addition to transmitter simplification and commonality, it is also possible for receivers to be dramatically simplified, since their reception and transport packet processing logic is nearly identical for the three cases of Negative AcKnowledge (NAK)-based retransmission, spatial redundancy, or temporal redundancy.

Detailed Description

Figure 1:
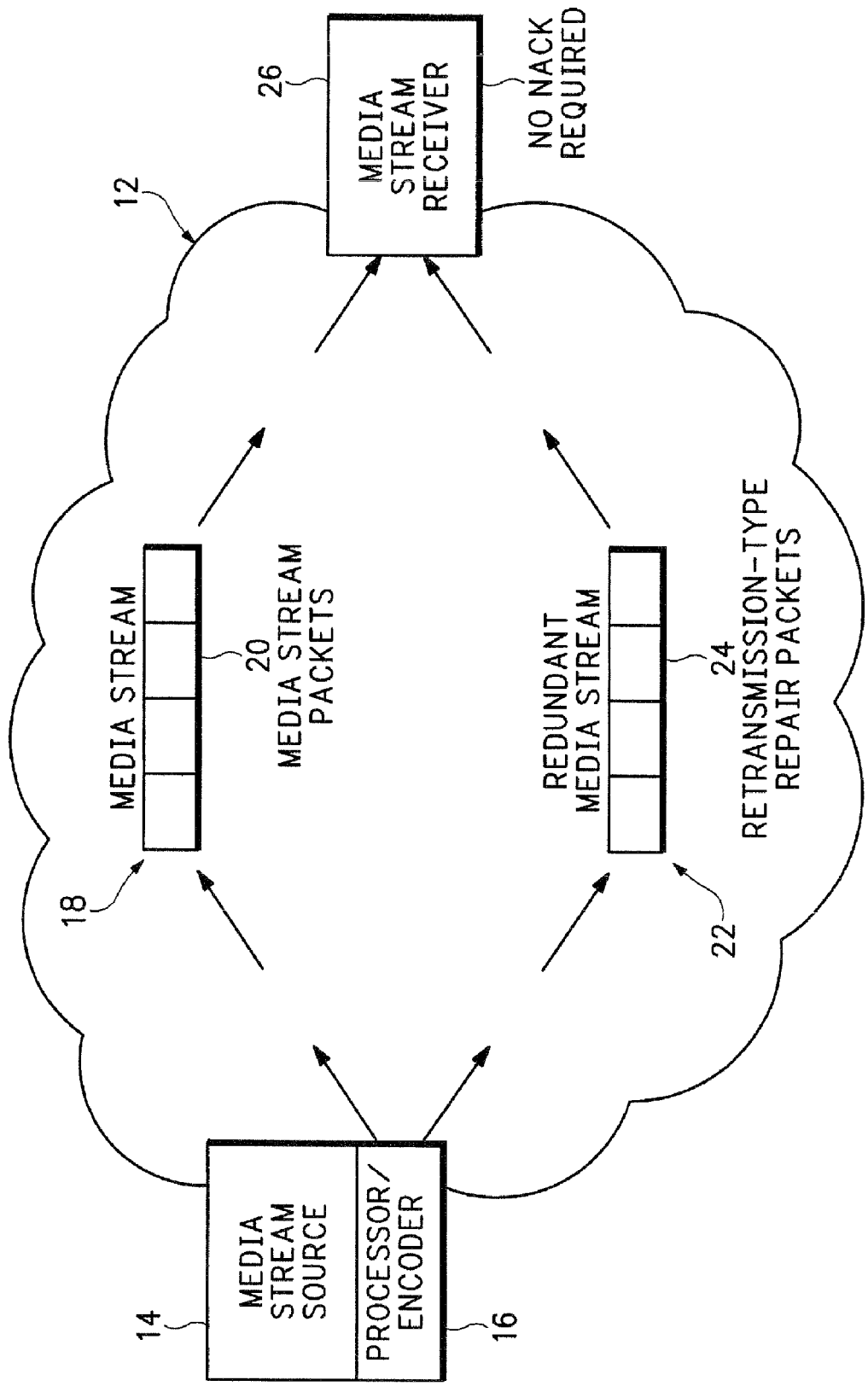
FIG. 1 is a diagram showing one example of a redundant media stream encoded as retransmission-based repair packets.

Referring to FIG. 1, a media stream source 14 may be a server, computer, or any other type of network processing device that can source Internet Protocol (IP) media, such as video, audio, voice, data, etc., over an IP packet switched network 12. In this example, the media stream source 14 includes a processor, alternatively referred to as an encoder, that encodes and transmits a media stream 18 to one or more media stream receivers 26 over the IP network 12.

The media stream receiver 26 can be any device that receives and stores or renders the multicast or unicast media stream 18. For example, the media stream receivers 26 can be Set Top Boxes (STB), Digital Video Recorders (DVR), computer terminals, Personal Computers (PCs), televisions with IP interfaces, Voice over IP (VoIP) phones, cell phones, Personal Digital Assistants (PDA), etc.

Additionally, the media stream receivers could be edge devices in the IP network which further process the video streams, or provide gateway functions to other kinds of networks. These include edge retransmission servers, Edge Quadrature Amplitude Modulators (EQAM) in a digital cable TV network, satellite up-links in a satellite TV distribution network, or media relays in mobile networks such as cellular telephony systems.

The encoder 16 also encodes and transmits a redundant media stream 22 to the media stream receivers 26 to account for packets 20 in media stream 18 that may be lost or dropped while being transported over packet switched network 12. The redundant media stream 22 is encoded as retransmission-type repair packets 24 that are normally only transmitted by explicit requests from a separate retransmission system. The redundant media stream 22, like the media stream 18, may be either multicast or unicast.

The repair packets 24 in earlier systems were only sent to replace or repair individual media stream packets 20 pursuant to a NACK request from media stream receiver 26. However, in this embodiment, the retransmission packets 24 are used to transmit an entire redundant copy of the media stream 18 without first receiving any Negative ACKnowledge (NACK) repair request from media stream receiver 26.

The Realtime Transport Protocol (RTP) Request For Comment (RFC) 3550 has a standard packet encoding for transmitting media streams on an IP network. It has been extended through RFC 4585 entitled "Extended RTP Profile for Realtime Transport Control Protocol (RTCP)-Based Feedback (RTP/AVPF)" with a set of feedback algorithms to enable retransmission-based repair of both unicast and multicast media streams.

In one embodiment, the media stream 18 is encoded as RTP packets for a normal RTP media session. The redundant media stream 22 is encoded as RTP retransmission packets as described in RFC 4588 entitled: RTP RETRANSMISSION PAYLOAD FORMAT which is incorporated by reference. Together, these specifications provide the basic means for unicast retransmission repair of unicast streams, and multicast retransmission repair of multicast streams. A retransmission scheme for unicast repair of multicast streams is described in co-pending U.S. patent application Ser. No. 11/561,237, filed Nov. 17, 2006, entitled: Retransmission-Based Stream Repair and Stream Join, which is also herein incorporated by reference.

The media stream receiver 26 receives both the native media packets 20 and the retransmit-encapsulated packets 24. This allows the receiver 26 to recover the original media stream 18 by simple selection rather than having to do duplicate detection and suppression.

Figure 2:
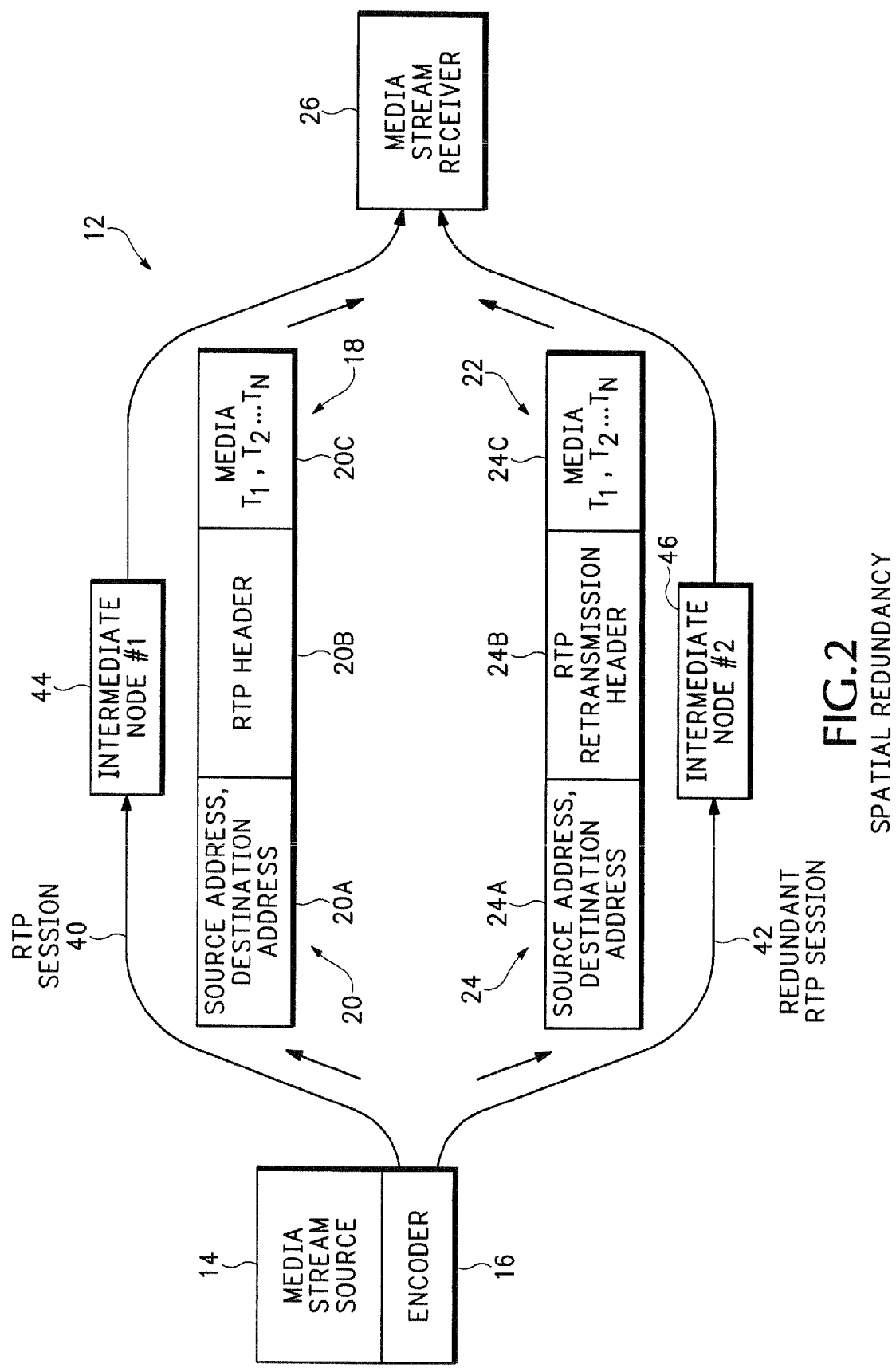
FIG. 2 shows how the retransmission packets can be encoded to provide spatial redundancy.

Referring to FIG. 2, to provide spatial redundancy, the native RTP media stream 18 and the redundant retransmission stream 22 are sent as separate RTP sessions 40 and 42, respectively. For unicast, the RTP sessions 40 and 42 are sent using different IP unicast destination addresses in IP headers 20A and 24A, respectively, which allow the routing system to differentiate them and send them over separate paths. The source address may be the same or different without affecting how the routing system handles them.

For either conventional Any-Source Multicast (ASM) or Source-Specific Multicast (SSM) the addresses in IP headers 20A and 24A specify separate multicast groups. In the SSM case, the destination group address can be common between the two streams 18 and 22 and the source address is different. In either ASM or SSM, the destination group address may be different for the two streams 18 and 22 and the source addresses are the same. In yet another embodiment, both the destination group address and the source address are different for the two streams 18 and 22.

Using separate IP addresses for the two RTP sessions as described above allows media packets 20 for media stream 18 and media transmission packets 24 for the redundant media stream 22 to travel over different disparate paths in the packet switched network 12. For example, the packets 20 for media stream 18 are shown going through an intermediate node 44 wherein the retransmission packets 24 for redundant media stream 22 are shown going through an intermediate node 46. Using different network paths can increase the likelihood packets from at least one of the two media streams 18 or 22 will successfully arrive at media stream receiver 26. If the two paths are completely disjoint, the media is protected from any single failure, of any duration, anywhere in the network.

Techniques for ensuring spatial redundancy for different media sessions include Multi-Protocol Label Switching (MPLS) Traffic Engineering (TE) tunnels or Multi-Topology Routing (MTR).

The different RTP sessions 40 and 42 can be provided even though the two media steams 18 and 22 are constructed by the same media stream source 14. The media stream source 14 may simply use a different IP source address for the two media streams 18 and 22.

Figure 3:
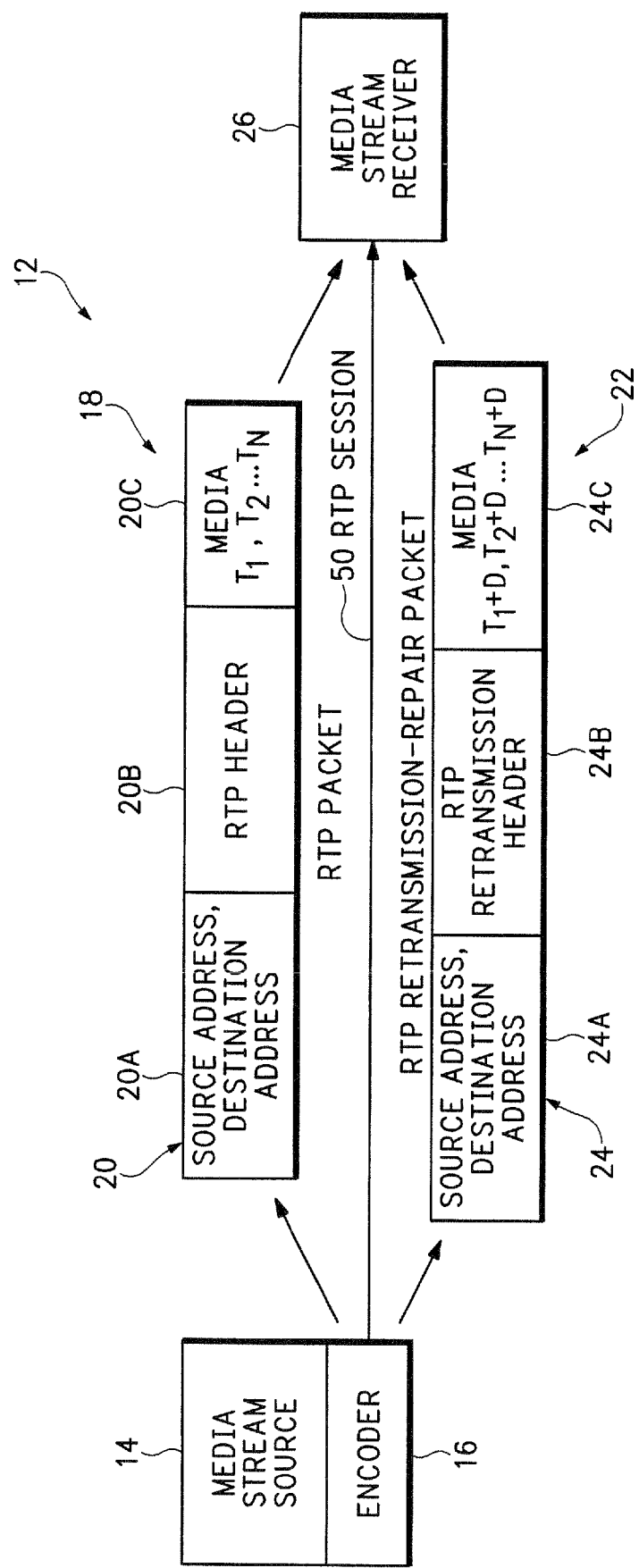
FIG. 3 shows how the retransmission packets can be encoded to provide temporal redundancy.

FIG. 3 shows how the retransmission packets 24 can provide temporal redundancy. A time-delayed media stream 22 is sent as part of the same RTP session 50 used for transmitting media stream 18. Sending the native RTP media stream 18 and the redundant RTP media stream 22 on the same RTP session means the packets 20 and 24 are allowed to follow the same route through the packet switched network 12 rather than being spatially split over disjoint paths as described in FIG. 2. In one embodiment this common RTP session 50 is provided by using the same multicast group addresses 20A and 24A in both the native media packets 20 and retransmission packets 24. In another embodiment the native and retransmission packets are carried in the same unicast RTP session.

The two media streams 18 and 22 can be distinguished through the difference in encoding. The native packets 20 are encoded as RTP packets using RTP headers 20B and the redundant media stream 22 is encoded as retransmission packets using RTP retransmission headers 24B.

Figure 4:
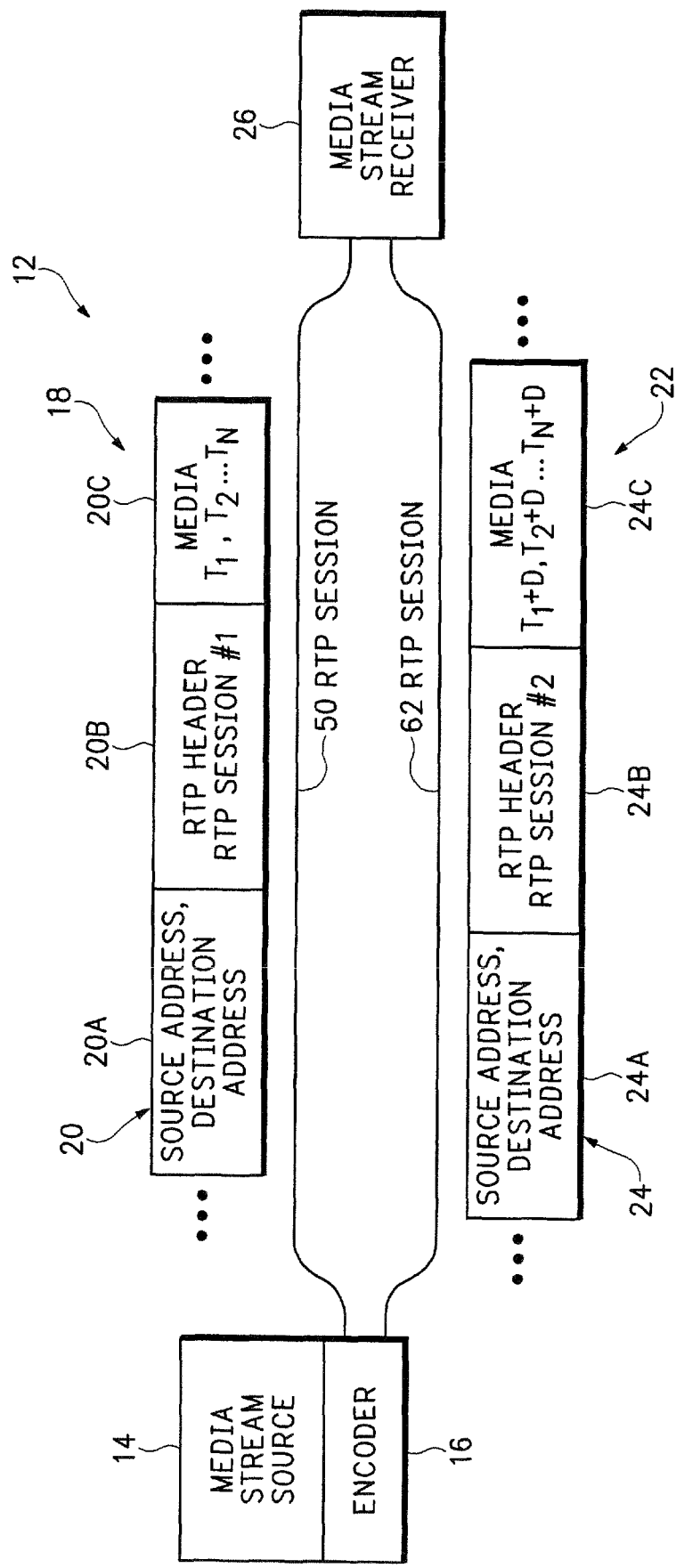
FIG. 4 shows how the retransmission packets can be encoded to provide temporal redundancy in separate media sessions.

FIG. 4 shows how separate RTP sessions can be used to provide temporally redundant streams. The time-delayed redundant media stream 22 in this example is sent over a different RTP session 62 from the RTP session 50 used for transmitting the native media stream 18. However, the two media streams 18 and 22 each use the same destination IP addresses 20A and 24A, respectively. Thus, the native RTP media stream 18 and the redundant RTP media stream 22 while associated with different RTP sessions are still allowed to follow the same route through the packet switched network 12 rather than being spatially split over disjoint paths as described in FIG. 2. In this embodiment, the two media streams are distinguished by destination UDP/IP port number rather than by destination IP address.

There is an advantage to the two-stream approach shown in FIG. 2 even in the case of temporal redundancy in that using separate sessions retains backward compatibility with media stream receivers 26 that do not understand RTP retransmissions or do not have enough bandwidth or processing capability to receive the retransmission stream. Those receivers simply do not participate in the retransmission session.

Fast reroute may be used in combination with the retransmission packets as an alternative to stream redundancy. For example, Point-To-MultiPoint (P2MP) MultiProtocol Label Switching (MPLS) with MPLS Fast ReRoute (FRR), or native IP FRR can be used. These techniques can bound the outage periods to be less than the time period covered by the temporal redundancy.

Both the spatial and temporal redundancy schemes may use the Session Description Protocol (SDP) so that both the receivers 26 and the transmitters 14 know exactly how the media streams are encoded, whether one or two groups are used in the case of multicast, and how the RTP protocol types for the native and redundant streams are assigned.

Figure 5:
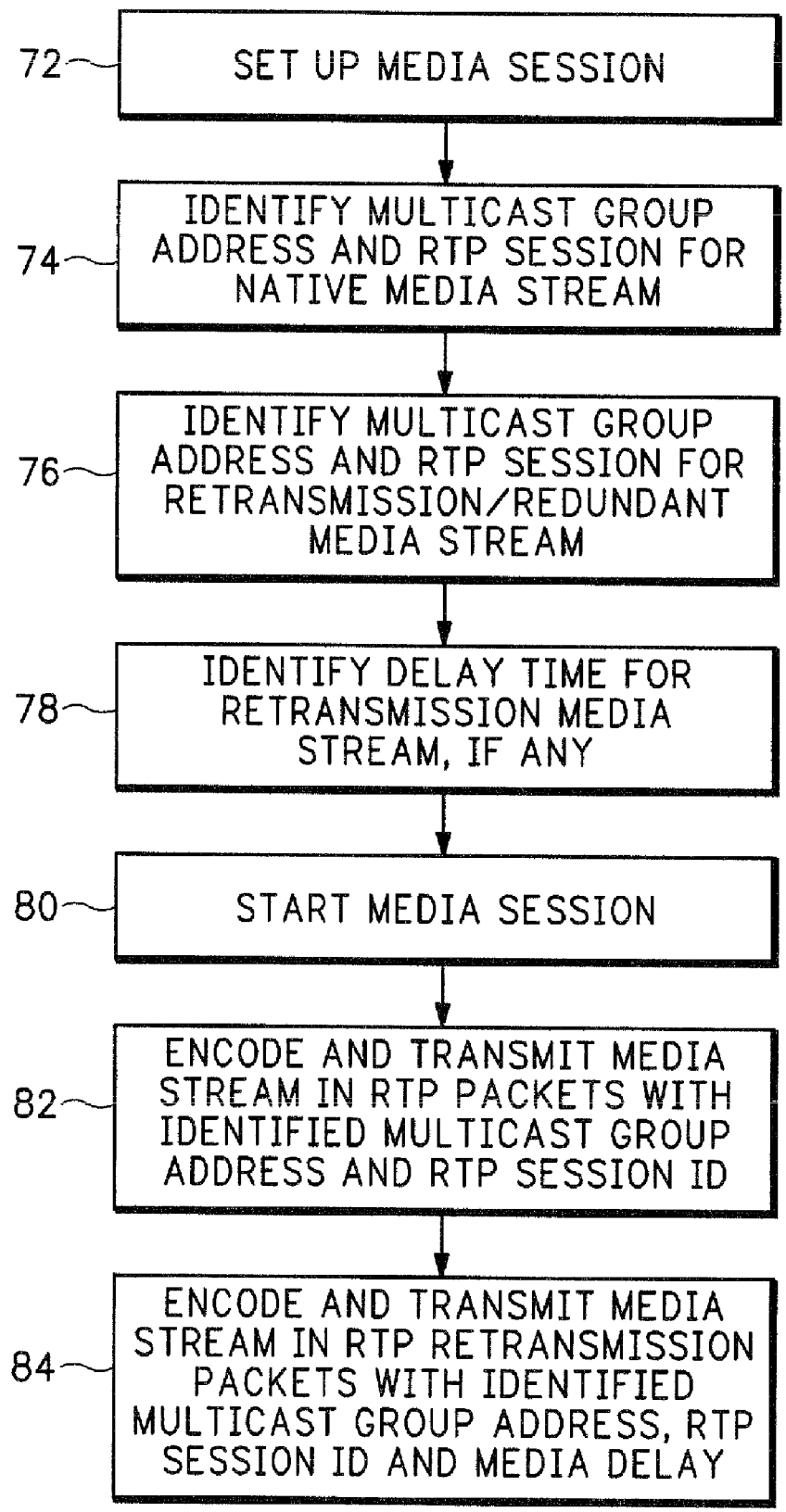
FIG. 5 is a flow diagram showing how redundant media sessions are set up.

FIG. 5 shows in more detail how the media streams may be established. In operation 72 the media sessions are set up for both the native and redundant media streams. In one example, as described above, the media sessions may be set up using SDP. Of course other protocols or description techniques could also be used. In operation 74 the destination address (either unicast or multicast) and RTP session are identified for the native media stream. In operation 76, the destination address (either unicast or multicast) and RTP session are identified for the retransmission repair-type redundant media stream. As described above, the destination addresses and RTP sessions could be either the same or different. Operation 78 then identifies any delay time that may be associated with the retransmission type media stream.

The media session begins in operation 80. The native media stream is encoded into RTP packets and transmitted with the identified destination and source addresses and RTP session identifier in operation 82. The retransmission repair-type media stream is encoded into RTP packets and transmitted with the identified destination and source addresses and RTP session identifier in operation 84. If there is a delay time associated with the retransmission stream, then each packet is encoded with the media associated with the identified delay.

The spatial redundancy scheme and the temporal redundancy scheme described above can also be easily combined with existing anycast sourcing of streams to protect against feed loss.

The media stream receivers 26 may already be implemented to support the general notion of joining RTP sessions on multiple multicast groups and may already understand the RTP retransmission packet formats. These receivers may then be oblivious to whether spatial or temporal redundancy is being employed. These receivers 26 just see a different RTP packet arrival order.

An additional benefit to using retransmission as the model for stream redundancy is that all the RTP Control Protocol (RTCP) reception statistics are directly usable to assess stream quality, and can be used to measure outage characteristics by comparing the reception statistics of the native and retransmission streams. Further, this is reported back to the media stream source 14 via RTCP receiver reports so the characteristics and performance of the redundancy scheme is known to both the media stream receiver and media stream transmitter. In the case of large scale multicast using Visual Quality Experience (VQE)-like technology with quality monitoring servers in the network, the receiver reports can be summary reports in order to avoid swamping the transmitters with statistical data.

By utilizing a retransmission paradigm for stream redundancy, and the RTP retransmission framework in particular, a simpler, more flexible system can be used that provides high video robustness through stream redundancy. A common technique for NACK-based retransmission, temporal redundancy, and spatial redundancy is also provided. Existing standard packet encodings and RTP transmit and receive algorithms are also leveraged.

Significant reduction in receiver complexity is achieved over individual schemes having different redundancy/repair models. The retransmission-based repair scheme can also easily measure stream quality in a redundant stream environment.

These redundancy schemes can be used in any network-based equipment that generates real-time media streams. For example, broadcast servers, Video On Demand (VOD) servers, voice mail servers and voice and video endpoints.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:
   establishing a first Real Time Protocol (RTP) session for transmitting a media stream;
   wherein the first RTP session is established with a receiver that operates according to a selective retransmission protocol, the selective retransmission protocol configured to generate and send a retransmission request to a transmitter for an ad hoc retransmission responsive to the receiver alerting the transmitter that at least a portion of an original transmission from the transmitter is not received;
   encoding the media stream into a first set of media stream packets, wherein the first set of media stream packets encapsulates the media stream using a header of a first type;
   transmitting the first set of media stream packets according to the established first RTP session;
   establishing a second RTP session with the receiver;
   using a same encoder that was used to encode the first set of media stream packets, encoding the media stream into a second set of retransmission-based repair packets, wherein the second set of retransmission-based repair packets encapsulates the media stream using a header of a second different type; and
   transmitting, at a time that is delayed with respect to the transmission of the first set of media stream packets, the second set of retransmission-based repair packets having the header of the second different type as a redundant copy of the media stream, said transmitting using the selective retransmission protocol;
   wherein the transmitting using the selective retransmission protocol is time-delayed, but unconditional, namely without receiving any retransmission requests from the receiver; and
   wherein both temporal and spatial redundancy are provided via a single retransmission using the selective retransmission protocol.

2. The method according to claim 1, wherein the first set of media stream packets and the second set of retransmission-based repair packets are sent over different network paths by varying a value of a parameter in the header of the second type from a value of a parameter in the header of the first type.

3. The method according to claim 1, including:
   encoding the first set of media stream packets as RTP packets, wherein the first set of media stream packets encapsulates the media stream using a native RTP header; and
   encoding the second set of retransmission-based repair packets as RTP retransmission packets, wherein the second set of retransmission-based repair packets encapsulates the media stream using a retransmission RTP header.

4. The method according to claim 1, including using different unicast destination addresses, Any-Source Multicast (ASM) groups, or Source-Specific Multicast (SSM) groups for transporting the first set of media stream packets and the second set of retransmission-based repair packets.

5. The method according to claim 1, including:
   using a different source Internet Protocol (IP) address for the first set of media stream packets and the second set of retransmission-based repair packets, wherein the header of the first set of packets specifies a different source IP address than the header of the second set of packets.

6. The method according to claim 1, further comprising transmitting the second set of retransmission-based repair packets having the header of the second different type as the redundant copy of the media stream independently of receiving any indication of lost or dropped packets from the first set of media stream packets during the network session.

7. An apparatus, comprising:
a processor configured to:
establish a first network session for transmitting a media stream to a receiver;
encode the media stream into a first set of media stream packets, wherein the first set of media stream packets encapsulates the media stream using a header having a first packet structure;
transmit the first set of media stream packets according to the established first network session;
establish a second network session with the same receiver;
encode the media stream into a second set of retransmission-based repair packets, wherein the second set of retransmission-based repair packets encapsulates the media stream using a header having a second different packet structure; and
transmit, at a time that is different than the time for transmission of the first set of media stream packets, the second set of retransmission-based repair packets having the header of the second different packet structure as a redundant copy of the media stream, said transmitting using a selective retransmission protocol;
wherein the transmitting using the selective retransmission protocol is unconditional, namely without receiving any corresponding retransmission requests of the selective retransmission protocol; and
wherein both temporal and spatial redundancy are provided via a single retransmission using the selective retransmission protocol.

8. The apparatus according to claim 7, wherein the processor is configured to establish the first and second network sessions as Real Time Protocol (RTP) media sessions, to encode the media stream into RTP packets for the first RTP media session, and to encode the same media stream into RTP retransmission packets for the second RTP media session.

9. The apparatus according to claim 8, wherein the processor is configured to use different destination addresses in the two separate RTP media sessions.

10. The apparatus according to claim 8, wherein the processor is configured to use different source addresses for the packets in the two separate RTP media sessions.

11. The apparatus according to claim 8, wherein the processor is configured to encode both media streams using a same unicast source address, Any-Source Multicast (ASM) group, or Source Specific Multicast (SSM) group.

12. The apparatus according to claim 11, wherein the processor is configured to offset media times for the two media streams according to expected network outage times.

13. An article of manufacture including a computer readable memory device having instructions stored thereon that, in response to execution by a computing device, cause the computing device to perform operations comprising:
establishing a first Real Time Protocol (RTP) session for transporting a media stream to a receiver;
encoding the media stream into RTP packets for transporting over a packet switched network to the receiver, wherein the RTP packets encapsulate the media stream using a header formatted according to a first RTP protocol;
transmitting the RTP packets according to the first RTP session;
establishing a second different RTP session to the receiver;
encoding the same media stream into RTP retransmission packets for the second RTP session, wherein the RTP retransmission packets encapsulate the media stream using a header formatted according to a second different RTP protocol; and
transmitting, at a time that is different than the time for transmission of the first set of media stream packets, the RTP retransmission packets having the header formatted according to the second different RTP protocol, said transmitting using a selective retransmission protocol;
wherein the transmitting using the selective retransmission protocol is unconditional, namely without receiving any corresponding retransmission requests of the selective retransmission protocol; and
wherein both temporal and spatial redundancy are provided via a single retransmission using the selective retransmission protocol.

14. The article of manufacture according to claim 13, wherein the operations further comprise using a different multicast group destination address for the RTP packets and the RTP retransmission packets.

15. The article of manufacture according to claim 13, wherein the operations further comprise using a same destination address and source address for both the RTP packets and the RTP retransmission packets.

* * * * *